(12) United States Patent    (10) Patent No.: US 7,459,019 B2
Barlet-Gouedard et al.    (45) Date of Patent: Dec. 2, 2008

(54) CEMENT COMPOSITIONS FOR HIGH TEMPERATURE APPLICATIONS

(75) Inventors: Véronique Barlet-Gouedard, Chatenay Malabry (FR); Chrystel Cambus, Richebourg (FR); Samuel Danican, Houston, TX (US); Erik Nelson, Houston, TX (US); Bruno Goffe, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 603 days.

(21) Appl. No.: 10/504,772

(22) PCT Filed: Feb. 14, 2003

(86) PCT No.: PCT/EP03/01578

§ 371 (c)(1),
(2), (4) Date: Mar. 10, 2005

(87) PCT Pub. No.: WO03/068708

PCT Pub. Date: Aug. 21, 2003

(65) Prior Publication Data

US 2005/0160945 A1    Jul. 28, 2005

(30) Foreign Application Priority Data

Feb. 18, 2002 (GB) ................... 0203729.9
Jun. 14, 2002 (GB) ................... 0213690.1
Jan. 17, 2003 (GB) ................... 0301060.0

(51) Int. Cl.
C04B 7/02 (2006.01)

(52) U.S. Cl. .................. 106/705; 106/713; 106/718; 106/737; 166/292; 166/293

(58) Field of Classification Search ............. 106/718, 106/705, 713, 737; 166/292, 293
See application file for complete search history.

(56) References Cited

U.S. PATENT DOCUMENTS 4,640,715 A * 2/1987 Heitzmann et al.
4,642,137 A * 2/1987 Heitzmann et al.
6,221,148 B1 * 4/2001 Mathur et al. ............... 106/484

* cited by examiner

*Primary Examiner*—Paul Marcantoni
(74) *Attorney, Agent, or Firm*—David Cate; Robin Nava; Dale Gaudier (57) ABSTRACT

In a process to design high temperature cement slurries, the temperature stable phases (anorthite, wairakite) are selected; aluminum modifiers and silica oxides are added to the dry cement so that the elemental composition of the blend corresponds to the phases selected; the control of the particle size distribution and the relative amount of those minerals allow their addition at high concentration while leaving the slurry easily mixable and pumpable; and the kinetics of the targeted phases formation is then controlled by adjusting the crystallinity and the particles sizes of the different solids.

11 Claims, 8 Drawing Sheets

CEMENT COMPOSITIONS FOR HIGH TEMPERATURE APPLICATIONS

The present invention relates to cement compositions for high-temperature applications. The invention provides not only compositions, but methods for the design of such compositions and methods for their use, particularly in relation to the cementing of wells or pipes.

In the construction of wells, cement is used to secure and support casing inside the well and prevent fluid communication between the various underground fluid-containing layers or the production of unwanted fluids into the well. Such techniques are used when completing underground oil, water, gas or geothermal wells or the like. In geothermal applications, cement is also often used to line pipes carrying the steam or hot brine from the well to a location where it can be used for heating or power generation. Such applications constitute particularly aggressive environments for cement, both by virtue of the high temperature and the frequent presence of aggressive chemical environments such as brines and carbon dioxide. In order that the cement can fulfil the functions set forth above, it is necessary that the cement is as durable and resistant to chemical attack as possible while still being able to perform the desired functions. The behaviour of cements under such conditions is discussed in Berra, M. et al. (1988). Behaviour of cementing hydraulic binder under severe geothermal conditions. Geothermics, Vol. 17, No. 5/6, pp 785-813.

In most cases, the hydraulic binder used in such cementing applications is Portland cement, often with the addition of various solid and liquid additives. Portland cement is composed of calcium silicates and calcium aluminosilicates. In the presence of water, those mineral phases hydrate and form hydrated calcium silicate (CSH) and also portlandite (Ca(OH)$_2$) and aluminium sulphate. At temperatures below about 100° C., CSH is a gel, and is largely responsible for the cohesion and mechanical strength of the set cement in the short to medium term.

When the temperature exceeds about 100° C., in the first days or months the majority of cements lose compressive strength and become permeable. Then they regain their strength and their permeability reduces. That phenomenon, known as retrogression, is due to metamorphosis of CSH gel to a highly crystalline phase known as alpha dicalcium silicate, $\alpha$-C$_2$SH, which is much more dense than CSH with a contraction in volume and an increase in the porosity and permeability of the cement. This results in disintegration of the cement, which increases in rate as the porosity and permeability increases, rendering it more sensitive to chemical attack such as channelling of brine or circulation of carbon dioxide.

To avoid the phenomenon of retrogression, it has been proposed to add silica in the form of sand or silica flour to compositions which have to withstand temperatures of more than 100° C. Adding 35% to 40% of silica (with respect to the weight of the Portland cement) brings the CaO/SiO$_2$ ratio (usually denoted C/S) to about 1. An example of such an approach can be found in WO 97/49644.

With this modified composition, CSH gel reacts with the added silica to form the mineral tobermorite (C$_5$S$_6$H$_5$) at about 110° C. When the temperature is raised to 150° C., the tobermorite transforms into xonotlite (C$_6$S$_6$H). These minerals are intrinsically strong and can improve the stability and mechanical integrity of the cement at high temperatures in the absence of brine; however, owing to slight differences in their respective densities, the recrystallizations can destabilise the cement and cause the permeability of the set cement to increase. At 250° C. truscottite (C$_7$S$_{12}$H$_3$) begins to appear. Owing to the manner in which truscottite crystallizes, a reduction in permeability is usually observed. (Nelson, Well Cementing—"Thermal Cements" 1990 9.1-9.19; J P Gallus et al, "Performance of Oil-Well Cementing Compositions in Geothermal Wells" SPE 7591 1978; L H Eilers et al, "High Temperature Cement Compositions—Pectolite, Scawtite, Truscottite or Xontolite: Which Do You Want?" JPT 1983 1373-1377). As the temperature approaches 400° C. (750° F.), both xonotlite and truscottite are near their maximum stable temperatures, and dehydration of residual CH to C occurs (Nelson, Well Cementing—"Thermal Cements" 1990 9.2).

The degradation mechanisms described above are certainly not exhaustive, the roles of other oxides present in the Portland cement, in particular alumina and ferrites, have not been presented, but they suffice to demonstrate the complexity of the phenomena occurring, without even considering the reaction products between the cement matrix and brines. In nature, in a geological medium, cement is thus meta-stable. In contact with brine, its mineralogical repertoire is modified by ion exchanges, which modify its physical qualities.

The problems of cement disintegration when the temperature is raised are more severe when developing very deep wells, injecting steam to recover highly viscous oils (steamflood), in geothermal, or in in-situ combustion recovery applications (firefloods). Geothermal wells are wells drilled into formations that contain superheated brines. At surface the brine is converted to steam which is then used to produce electricity. Steamflooding is a process where steam is injected into formations that contain viscous oil. The rise in temperature causes the viscosity of the oil to reduce, allowing it to flow to a production well and to be pumped to surface.

The temperature and pressure conditions encountered in such wells vary between 200-300° C. and 10 MPa-95 MPa, respectively. Fireflood consists of initiating combustion underground in an injection well, and then propagating the combustion front through the underground formation by the injection of air through the reservoir to the production well. In such wells, the cement is exposed to maximum temperatures between 371° C. and 926° C. (700° F.-1700° F.) near the burning zone. Such temperatures exceed the stable range of Portland cement.

One approach explored in work by Roy et al. ("Potential New High Temperature Cements for Geothermal Wells" AIME International Symposium on Oilfield and Geothermal Chemistry, Houston, Tex. 1979, pp 153-161) showed that the mineral anorthite was promising as a binder in geothermal well cements. However, the practical problem of formulating a pumpable cement slurry with a predictable working time remained to be solved. GB 1,525,236 and JP 3055899 both disclose the formation of anorthite in the manufacture of cementitious materials but give no teaching on the relevance of such a mineral phase to the high-temperature cementing operations of the present invention.

EP 0 922 013 A proposes compositions which may be stable at the temperatures of interest which can promote the formation of calcium hydrogarnets from the series [SiO$_4$]Ca$_3$M$^{3+}$, where M=Al (grossularite) or M=Fe (andradite) by adding alumina or ferrite. The quantity added is typically in the range 20% to 50% (by mass with respect to the mass of Portland cement), i.e., of the same order of magnitude as the amount of silica added. A more particularly preferred composition is constituted by class G Portland cement, 30% to 40% of silica (preferably of the order of 35%) and 20% to 40% of alumina (preferably of the order of 30%). The mineral phases favoured by these compositions are principally of varying composition, in particular hydrogarnets from the hydrogrossularite series, with a structure derived from calcium garnets $Ca_3Al_2Si_3O_{12}$ ($C_3AS_3$) with the silica atoms omitted and replacement of the oxygen atoms to which they were bonded by hydroxyl groups. When all of the silicon atoms are replaced, $C_3AH_6$ is obtained. Under the selected experimental conditions (288° C., 20 MPa), those garnets have been shown to be poorly constituted in part, with low reproducibility of crystallisation leading to larger or smaller crystals associated with high heterogeneity in compression test results.

WO00/70646 A proposes formulations suitable for cementing oil, gas, geothermal wells or the like, based on a Portland and alumina type cement tending to form mineral phases such that the properties of the cement matrix, in particular regarding compressive strength, do not degrade in practice under the effect of a rise in temperature and pressure (250° C.-300° C.; 20 MPa) and/or chemical attack (brines). The proposed compositions provide a cement matrix included in the Si—Ca—Al triangle in one of the margarite-haüyne-[epidote/pumpellyite], haüyne-prehnite-[epidote/pumpellyite] and haüyne-prehnite-pectolite composition triangles. In these triangles of the Si—Al—Ca—Na system, many mineral phases exist that are stable under the temperatures and pressures under consideration. The preferred compositions of WO01/7064 are located in the most calcium-rich zones, in particular close to the margarite-[epidote/pumpellyite]-pectolite junctions and margarite-prehnite-pectolite junctions, corresponding to compositions within the Si—Ca—Al triangle approximately in the zone delimited by silicon between 35% and 50%, aluminium between 20% and 38% and calcium between 25% and 35%. The adjustment of the aluminium content of the compositions is achieved by the use of micro-alumina. While the correct mineral content is achieved by the use of this material, problems remain due to its relatively low reactivity and high cost.

Other approaches to the problems of high temperature cements can be found in U.S. Pat. No. 4,642,137; U.S. Pat. No. 4,877,452; U.S. Pat. No. 4,935,060; U.S. Pat. No. 5,158,613; U.S. Pat. No. 5,900,053; U.S. Pat. No. 6,332,921; U.S. Pat. No. 6,367,556; and U.S. Pat. No. 6,488,763.

EP 0 621 247 A describes a cement composition formed from particles having controlled particle size ranges or granulometries. By optimising the packing volume fraction of the particulate materials, cement slurries can be designed that have improved properties while remaining pumpable in normal field conditions.

It is an object of the present invention to provide a method to allow the design of cementing compositions suitable for the high-temperature applications discussed above with the aim of providing pumpable slurries that have sufficient strength and durability for the desired use. It is also an object to provide a series of such compositions and methods for their use.

A first aspect of the present invention provides a method of designing a cement slurry, comprising determining a temperature to which the cement slurry will be exposed in situ; determining a stable, thermodynamic equilibrium composition of a CaO—Al2O3-SiO2-H2O (CASH) mineral system at the determined temperature; determining proportions of cement and mineral oxides required to provide a mixture having the determined composition of the CASH mineral system; and defining a series of particulate materials of predetermined particle sizes and densities, and comprising the cement and mineral oxides in the determined proportions such that, when mixed with water, a pumpable slurry is formed.

This aspect of the present invention resides in the recognition that rocks of basic compositions (poor in silicon, rich in calcium) maintain low porosity and a good mechanical resistance during weathering and can be considered as good natural analogues to conventional cements. Anorthite, grossular, prehnite and zeolite occur in basic rocks of magmatic origin, transformed in metamorphic or hydrothermal conditions. The method according to the invention allows the development of formulations suitable for cementing oil, gas, geothermal wells or the like, based on a Portland and alumina type cement tending to form mineral phases corresponding to these basic rock phases such that the properties of the cement matrix, in particular regarding compressive strength, do not degrade in practice under the effect of a rise in temperature and pressure (250° C.-900° C.; 20 MPa) and/or chemical attack (brines, $CO_2$). By determining the chemical composition of a stable mineral system at the temperature of interest, and ensuring that the cementing composition has this composition, it is possible to provide s set cement that is stable, even at very high temperatures such as are encountered in fireflood wells.

The proportions of cement and mineral oxides required to form a stable cement can be determined from general thermodynamic rules, phase relations between minerals and fluids and minerals, activity models and homogenous and heterogeneous phase equilibria known and developed for natural silicon- and calcium-rich rock systems of mafic origin to predict the mineralogy and chemical behaviour of Portland cements or derived compounds set in environments comparable to those encountered in geological settings such as hydrothermal fields of metamorphism (temperature greater than 150-200° C., pressure greater that liquid-vapour transition curve).

The method provides cement slurries that promote early anorthite formation during the hydration of operating slurry by adding specific modifiers. Anorthite, characterized by solid solutions, exhibits the best adaptation to severe chemical environment.

In order to promote the formation of anorthite, specific modifiers have to be added to the cement powder. At the same time, the final slurry density often has to be as low as possible (e.g. 1.4 to 1.5 sg) (due to the low fracture-gradients generally experienced in geothermal wells) while maximizing the solid fraction of the slurry to decrease the permeability and increase the compressive strength. Higher densities (e.g. 1.9 sg) may also be provided for other applications such as fireflood.

To achieve this, the physics of optimizing the packing between the different components of the material has to be mastered. The particle size distribution of each component has to be optimum. For example, the solid components can be provided in three or four distinct particle size fractions to optimize the amount of solids in the mixture. This technique allows the use of large amounts of solids while making the slurry still easily pumpable.

Class G cement can conveniently be used as the hydraulic binder. Cenospheres or other hollow particulate material of very low density (0.7 to 0.8 sg) can be added to decrease the slurry density. A particularly preferred material in this class is S060 from the 3M Company which comprise high strength, low density microspheres having a particle size range of 50-300 microns and a density of 0.60+/−0.06 g/cm³. Such materials are particularly useful in high pressure applications Some of these materials can also add silica or aluminum to the systems in certain circumstances, depending on their composition and form. Silica, silica flour and aluminum modifiers (alumina, micro-alumina, clay as kaolinite and calcined products of kaolinite) can comprise other components of the blends.

Apart from the cement for which the particle size is typically defined by the manufacturer, particle size of cenospheres, silica and aluminum modifiers are carefully selected in order to achieve maximum packing of the blend. The size and the crystallinity of the different blend components allow control of the kinetics of anorthite formation.

A cementing composition according to the first aspect of the invention comprises Portland cement, a silica modifier comprising a material that contributes silica to the composition during setting reactions, and an aluminium modifier comprising a material that contributes aluminium to the composition during setting reactions, characterized in that the cement, silica modifier and aluminium modifier together define a stable, thermodynamic equilibrium composition of a $CaO$—$Al_2O_3$—$SiO_2$—$H_2O$ (CASH) mineral system at the temperature at which the cementing composition is to be placed, the cement, silica modifier, aluminium modifier and any other particulate additives defining a series of particulate materials in predetermined, substantially non-overlapping particle size ranges, and water in sufficient quantity to form a pumpable slurry.

In accordance with the present invention, there is provided a cement composition comprising a mixture of: (i) an hydraulic cement; and (ii) one or more additives that contribute Si, Ca and Al to the mixture; characterized in that it has a mineralogical composition within the Margarite-Quartz-Pectolite region of the Si—Ca—Al phase diagram, and in that the constituents are selected to optimise the formation of Anorthite.

Such compositions are useful for cementing wells such as oil, gas, geothermal, and water wells, in particular such wells that are subjected to high temperatures (in excess of 250° C. Another application for such cements is to serve as an inner lining for pipelines, particularly those that carry brines produced from geothermal wells. The cement lining prevents corrosion of the pipe as the brine is transferred from the wellhead to the power generating station.

Specific modifiers are added to cement powder to promote the formation of Anorthite. At the same time, it is preferred that the density range be as large as possible (for example, 1.3 sg to 1.94 sg) while maximizing the solid fraction of the slurry to decrease the permeability and increase the compressive strength. It is also preferred that the slurries are stable with respect to sedimentation.

To achieve these goals, the packing between the different components of the blend is optimised by selecting the particle sizes of the cement and additive materials used to make the slurry. By controlling the particle sizes of the solid constituents of the slurries, the packing volume fraction can be optimised. This technique allows the use of large amounts of solids while making the slurry still easily pumpable and stable with respect to sedimentation.

In accordance with a second aspect of the present invention, there is provided a cement composition comprising a mixture of: (i) an hydraulic cement; and (ii) one or more additives that contribute Si, Ca and Al to the mixture; characterized in that at least one additive comprises, kaolin, calcinations products of kaolin, metakaolin or calcinations products of metakaolin, in that it has a mineralogical composition within the Margarite-Quartz-Pectolite region of the Si—Ca—Al phase diagram, and in that the constituents are selected to optimise the formation of Anorthite.

Compositions falling within the Margarite-Quartz-Pectolite region of the Si—Ca—Al phase diagram have been found to be particularly stable at high temperatures. Furthermore, selecting the constituents to optimise the formation of anorthite avoids the formation of phases that, while stable at high temperatures, have a negative impact on the structural stability of the set cement, e.g. xonotlite in presence of brine or $CO_2$.

It is particularly preferred that the additives are selected to have a high reactivity such that anorthite forms quickly so as to avoid extensive formation of xonotlite. The chemical composition can be selected considering the selected Si—Ca—Al ratio, to optimise total reactivity and fast reactivity of the blend at a given temperature and pressure and the optimised particle size distribution in accordance with the optimised packing volume fraction.

Preferably, the compositions of the invention are located in the Si—Ca—Al triangle, in the zone delimited by silicon between 44% and 57%, aluminium between 18% and 32% and calcium between 18% and 32%.

Compositions in accordance with the present invention can be realised using different materials containing silicon, and/or aluminium which are added to an oilwell cement with or without pozzolanic material. The reactivity and particle size of each material are selected in order to quickly form anorthite and to reach a good mixability respectively.

Microsilica and silica/alumina microspheres, metakaolin (calcined kaolinite), kaolinite (clay), fly ash and silica with different particle sizes can be used as silicon and aluminium sources.

Calcination products of kaolin and/or metakaolin are particularly preferred materials. Calcination products of metakaolin comprise metakaolin that has been heated such that all water has been lost by dehydroxilization and at least part of the metakaolin phase has decomposed to spinel-type phase. Such compositions can be achieved by heating (calcining) metakaolin above 750° C. The degree of calcining (temperature and duration of heating) can be selected according to specific requirements. Full calcinations or sintering may not be appropriate in some circumstance. Such products have the advantage that they have good reactivity so as to form anorthite quickly and avoid the formation of xonotlite.

The present invention will now be described by way of examples, with reference to the accompanying drawings, in which.

Figure 1:
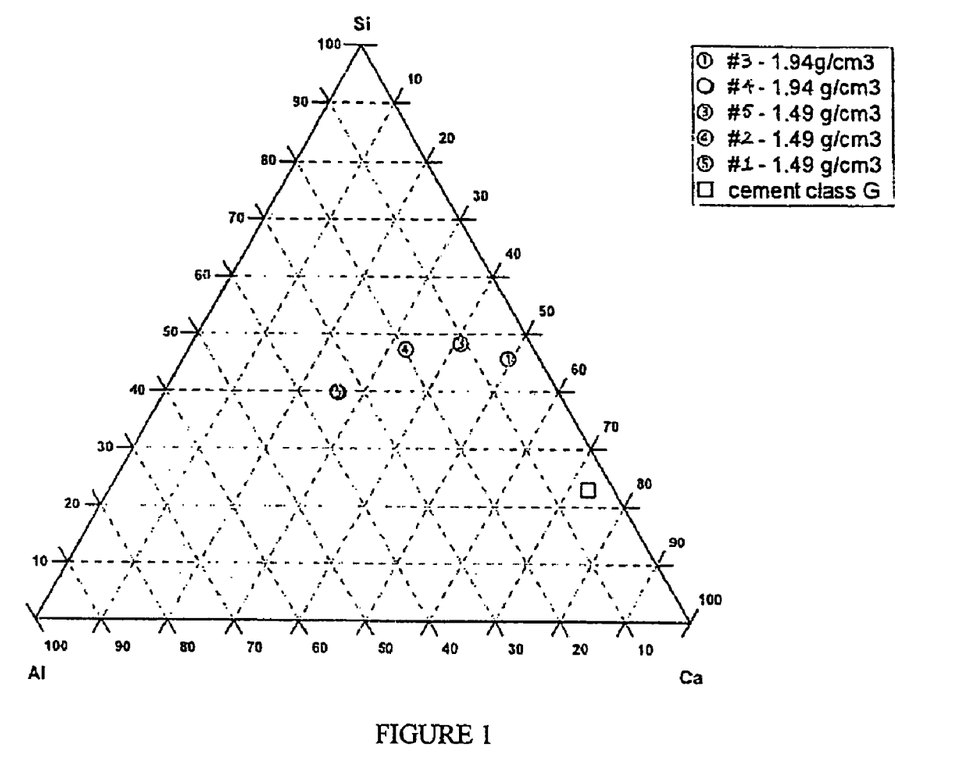
FIG. 1 shows a plot of blend compositions in the $CaO$—$Al_2O_3$—$SiO_2$ ternary diagram.

Different cement blends are prepared according to the method of the invention. Table 1 summarizes the physical properties of the blends and slurries. All slurry properties have been measured as per API specifications (API Recommended Practice for testing Oil-Well Cements and cement Additives (1990) API Spec. 10 Fifth Edition (Jan. 7, 1990)). The compositions of blends in the quaternary system ($CaO$—$SiO_2$—$Al_2O_3$—$H_2O$) are shown in FIG. 1. For comparison purposes, composition #1 is made according to prior art techniques.

TABLE 1

Properties of the slurries

| | No. slurry | | | | |
|---|---|---|---|---|---|
| | #1 | #2 | #3 | #4 | #5 |
| Density (g · cm$^{-3}$) | 1.4 | 1.49 | 1.49 | 1.94 | 1.94 |
| W/C ratio | 1.3 | 0.58 | 0.81 | 1.07 | 0.69 |
| Solids Volume Fraction | 0.40 | 0.59 | 0.59 | 0.43 | 0.42 |
| Free Water | 0 | 0 | 0 | 0 | 0 |
| Blend | Cement Silica flour Cenospheres — | Cement Silica flour cenospheres Aluminum modifier | Cement Silica flour cenospheres Aluminum modifier | Cement Silica flour Silica Aluminum modifier | Cement Silica Flour — — |
| Plastic viscosity (cP)/Yield value after mixing (lbs/100 sqft) | 33/6 | 257/29 | 109/9 | 53/21 | 149/11 |
| Plastic viscosity (cP)/Yield value after 20 min conditioning (lbs/100 sqft) | 16/13 | 109/3 | 54/6 | 30/15 | 85/7 |
| Reading on FANN mod.35SA viscosimeter (R1-B1-F1) Gel at 10 min | 11 | 21 | 15 | 35 | 4 |
| Thickening Time (hours) | 6:00 | 4:54 | 4:16 | 5:09 | 4:52 |
| 50 psi | 3:43 | 4:40 | 4:34 | 6:02 | — |
| 500 psi | 11:55 | 5:53 | 6:15 | 6:55 | 4:29 |
| Transit Time | 0:06 | 0:02 | 0:05 | 0:15 | 0:05 |
| Compressive Strength after 24 hours at 400° F. | 680 | 2100 | 1480 | 2420 | 6000 |

The slurries are mixed following the API procedure. Mixing is done in a Waring Blender. All solid components are dry blended before being added to the water containing the liquid additives. Samples are prepared for curing by pouring the mixed slurry into a 5 cm×5 cm×5 cm steel molds. Five cubes are prepared for each formulation.

The molds containing the slurries are cured for three days at 300° C. over 21 MPa in a standard oil well cement-curing chamber in water. The temperature is gradually increased to 300° C. over a 6-8 hour heat up period, to minimize possible cracking of the samples due to thermal expansion. The temperature is maintained at 300° C. and 21 MPa for 28 days, after which the system is allowed to cool down to room temperature.

The cured set cement samples obtained after 28 days exposure at 300° C., are drilled in 2.5×5 cm cores. These set samples are exposed to the production brine at 300° C. over 21 MPa in the high pressure—high temperature geothermal reactor for 28 days. The brine is regularly changed (every 3 days) to keep the solution saturated and to simulate as close as possible actual well conditions, where the brine is an "open system". The heating rate to reach 300° C. is 6° C./min.

Samples are then removed, kept under water at room temperature before being tested for the following physical property measurements:

Uniaxial compressive strength performed on 2.5×5 cm cores in using a compressive machine Water Permeability Mineralogical examination is carried out by x-ray powder diffraction using CuKα radiation. Scanning Electron Microscope images are used to describe morphologies of reaction products and to complete the XRD analysis.

Two types of brines are used to simulate the chemical attack. Table 2 shows the chemical composition of a production brine circulated in a Japanese geothermal well at 1300 meters with a production temperature around 300° C. The pH of this brine is 2.6.

TABLE 2

Chemical composition of the production brine (Brine 1)

| Ions | mg/l |
|---|---|
| Na | 3120 |
| K | 810 |
| Ca | 1460 |
| Mg | 270 |
| Cl | 9570 |
| $SO_4$ | 201 |
| $SiO_2$ | 144 |
| Fe | 648 |

The table 3 shows the composition of a California brine.

TABLE 3

Chemical composition of the field brine (Brine 2)

| Ions | g/l |
|---|---|
| NaCl | 200 |
| KCl | 23 |
| $CaCl_2$ | 63 |
| $MgCl_2.6H_2O$ | 1 |

The results of the mineralogical composition of the different samples before and after brine attack are presented in Table 4 below:

TABLE 4

Mineralogical composition of the different samples before and after brine attack

| | Formulation Number | | | | | | | | |
|---|---|---|---|---|---|---|---|---|---|
| | #1 | | #2 | | #3 | #4 | | #5 | |
| Density g/cm3<br>Brine 1 or 2 attack at 300° C.<br>@ 28 days | 1.49 | | 1.49 | | 1.49 | 1.94 | | 1.94 | |
| | Before brine attack | After Brine 1 attack | Before brine attack | After Brine 1 attack | Before brine attack | Before brine attack | After Brine 2 attack | Before brine attack | After Brine 2 attack |
| Xonotlite $C_6S_6H$ | ++++ | ++++ | ++ | ++ | ++ | ++ | ++ | ++++ | ++++ |
| Anorthite $CaAl_2Si_2O_8$ | ++ | ++ | ++++ | – | ++++ | +++ | ++++ | – | – |
| Anorthite, sodium, intermediate $(Ca, Na)(Si, Al)_4O_8$ | – | – | – | ++++ | – | – | ++ | – | – |
| Albite $NaAlSi_3O_8$ | – | – | – | +++ | – | – | – | – | – |
| Wairakite $CaAl_2Si_9O_{12}.2H_2O$ | – | – | ++ | ++ | ++ | – | – | – | – |
| Prehnite (zeolithe) $[Si_3AlO_{10}]Ca_2Al(OH)_2$ | – | – | – | – | – | ++ | + | – | – |
| Epidote I-2 $[Si_2O_7][SiO_4](OH)Al_2OCaAl_2$ | – | – | – | – | – | ++ | ++ | – | – |
| Garnet $[SiO_4]_3Al_2Ca_3$ | – | – | – | – | – | – | ++ | – | – |
| Quartz $SiO_2$ | + | – | – | – | + | +++ | – | – | – |
| Corundum $\mu Al_2O_3$ | + | – | + | – | ++ | ++ | – | – | – |

++++ Prevailing phase;
+++ phase in appreciable amount;
++ phase in fairly good amount;
+ phase in small amount.

Figure 2:
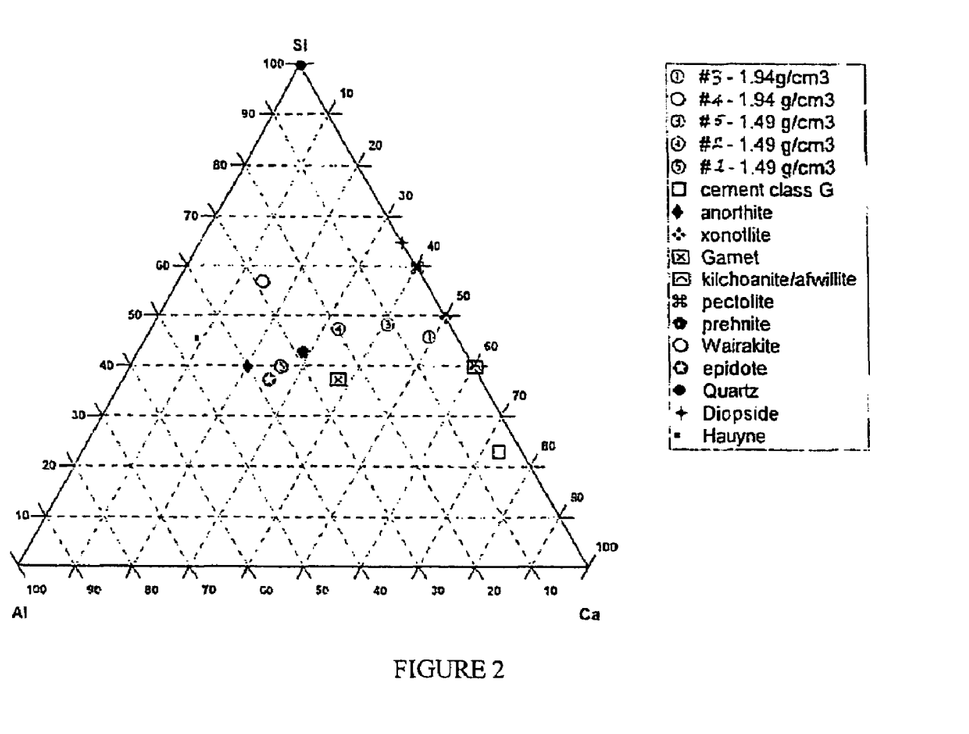
FIG. 2 shows mineral phases known to be stable in natural calcium-rich systems plotted of in the $CaO$—$Al_2O_3$—$SiO_2$ ternary diagram ($H_2O$ in excess)

FIG. 2 presents in the same quaternary system CASH as shown in FIG. 1, the blend compositions from Table 1 and the different mineral phases of basic rock after hydrothermal alteration known as stable at 300° C.

Two areas can be defined:

Area 1, outside the two joins Epidote-pectolite and Prehnite-pectolite

Area 2 near or inside these two joins where the formation of xonotlite can be avoided or limited.

In area 1, two compositions have been tested, #1 and #5 with 1.49 and 1.94 g/cm3 densities respectively. The phase responsible for the cementing properties within this region is mainly xonotlite.

With the low-density cement composition (#1), anorthite in a fairly good amount is easily detected. Its composition contains more alumina than the one at higher density. After brine 1 attack, the set cement matrix shows deleterious signs and the water permeability after one month in the Brine 1 increases. Fine needles of xonotlite shows dissolution signs particularly on the core borders.

In area 2, the compositions #2, #3, #4 are investigated. The composition #4 has a density of 1.94 g/cm³ and is cured in the brine 2. Compositions #2 and #3 have a lower density, 1.49 g/cm³. Phases responsible for the cementing properties within this area are mainly anorthite, whatever the slurry density. For the composition #2, a high temperature calcium zeolite, wairakite well detected by XRD and SEM analysis contributes with anorthite to favourable cementitious properties at 300° C. The composition #3, containing more alumina and less silica but having the same density, shows a mineralogical "assemblage" more complex: relic phases as silica and alumina are well detected and wairakite is less observed with SEM. This composition seems to be slower than #2.

If the slurry density is initially higher (#4), anorthite stays the main binder but prehnite, epidote are well detected. Relic phase as silica and alumina are still not completely consumed after one month at 300° C. Wairakite is not detected. Composition #4 contains a part of silica coarser than the one added in the composition #3. That can explain a lower reactivity after one month resulting from lower water saturation in silica useful to form this phase.

After brine attack, whatever the slurry density, anorthite evolutes to a sodic plagioclase member, albite that shows well the good adaptation of anorthite to chemical alteration.

The compressive strength and the water permeability of the set cement after curing without or with the brine are presented in table 5.

TABLE 5

Compressive strength before and after brine attack and water permeability after brine attack for the different compositions.

| | Formulation Number | | | | |
|---|---|---|---|---|---|
| | #1 | #2 | #3 | #4 | #5 |
| Density g/cm3 | 1.49 | 1.49 | 1.49 | 1.94 | 1.94 |
| BHST° F. | 300 | 300 | 300 | 300 | 300 |
| Compressive Strength (psi) at BHST after 1 month | 900 | 2332 | 800 | 2207 | 6352 |
| Water permeability (mD) | 0.66 | 0.16 | 0.2 | — | — |
| Compressive Strength (psi) at BHST after 1 month in brine | 830 | 2500 | — | 2300 | 5400 |

TABLE 5-continued

Compressive strength before and after brine attack and water
permeability after brine attack for the different compositions.

| | Formulation Number | | | | |
|---|---|---|---|---|---|
| | #1 | #2 | #3 | #4 | #5 |
| Water permeability (mD) after brine attack | 2.81 | 0.26 | — | — | — |

Even though the value of the compressive strength is lower for blend #2 than #1 before brine attack, after brine attack, the formulation #2 shows no decrease in the compressive strength. If the brine is directly added as mixing water, this trend is still observed contrary to the trend obtained with the formulation #1 where the compressivestrength decrease of 55% of its initial value.

The formulation #2, at a density of 1.49 shows no variations in the compressive strength before and after brine attack and only a slight increase in permeability.

The composition #3 exhibits the lower compressive strength with a chemical system not completely reacted.

Figure 3A:
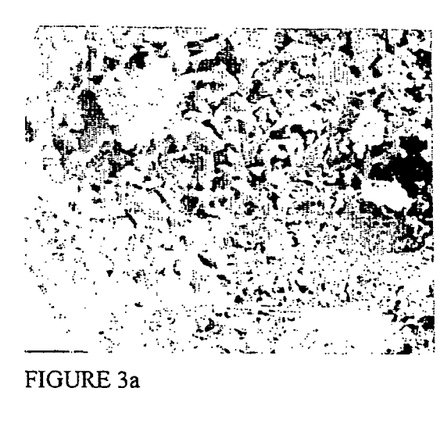
FIGS. 3a and b show SEM microphotographs of set cement matrix obtained in a "xonotlite dominant" sample.
Figure 3B:
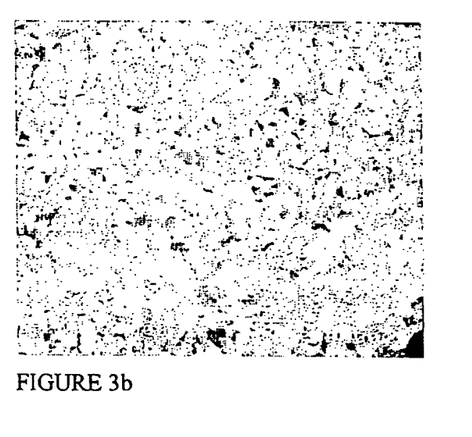
Figure 4A:
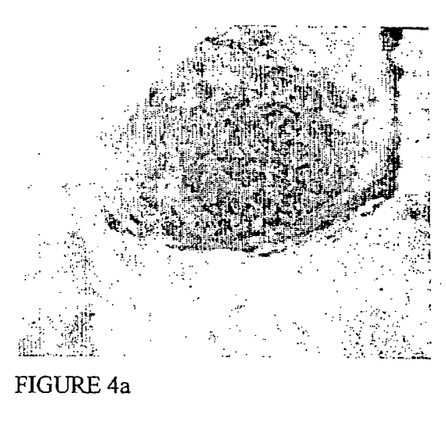
FIGS. 4a and b show SEM microphotographs of set cement matrix obtained in an "anorthite dominant" sample.
Figure 4B:
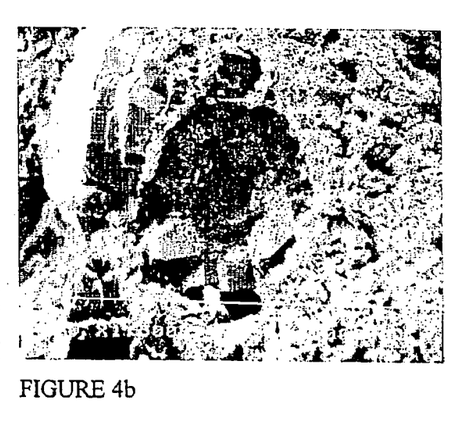

Electron microscopy gives morphological information that completes the chemical, physical, mechanical and diffractometric data. The set cement matrices provided from formulation #1 and formulation #2 are observed and compared before and after chemical attack. FIGS. 3a and b, and 4a and b present the set cement matrix obtained with the composition #2. Anorthite is well detected before and after brine attack in the interstitial matrix and crystallizes as interlocking platelets, which can contribute to a superior compressive strength measurement (FIGS. 3a and b). This phase is also met in some cavities observed in this low-density system. Again anorthite crystallizes under interlocking platelets, plugging the cavity (FIG. 4a). Wairakite is well observed in the interstitial matrix under cubic crystals and seems well stable after brine curing (FIG. 4b).

Figure 5A:
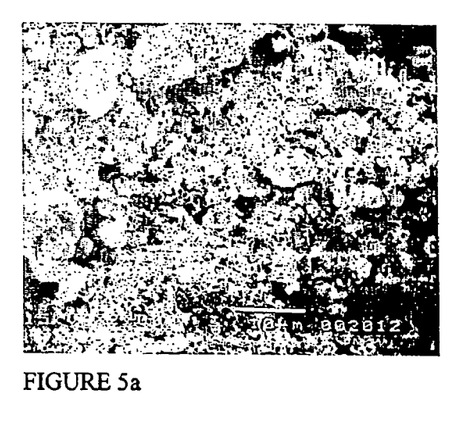
FIGS. 5a and b show SEM microphotographs of a set cement matrix of a further sample.
Figure 5B:
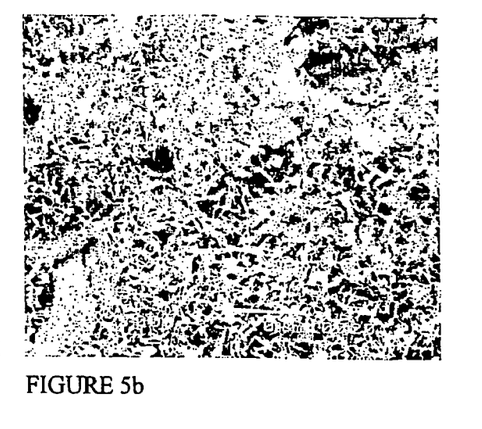

FIGS. 5a and b present the set cement matrix obtained with the composition #1. The samples have been cut in the core near the free surface and inside the core. In view of XRD analysis, xonotlite as fine needles, is the primordial hydrate. FIGS. 5a and b show the effect of brine curing through the core: in the core near the free surface, the signs of xonotlite dissolution in the interstitial matrix are more significant than inside the core. In view of the SEM observations, the increase of water permeability after brine curing can be explained: 0.66 mD and 2.8 mD before and after brine attack respectively.

In view of the mechanical and durability results, the composition #2 is a good candidate for geothermal applications. The permeability and the compressive strength are not affected after brine attack at 300° C. Indeed, the results have shown that the faster anorthite forms the lower strength retrogression is observed: at 300° C., the composition #2 exhibits the higher compressive strength with a complete reaction after one month at high temperature, the composition #3 exhibits the lower compressive strength with a chemical system not completely reacted.

The fact that the original material component (cement, cenosphere, aluminum modifiers) have completely reacted can partially explain this durability. Indeed, unreacted silica, and aluminum modifiers react with brine to give secondary phases which are not necessarily stable under these conditions.

Anorthite is the calcic member of the solid solution plagioclase that is well known to be stable at high temperature and which can adapt to brine circulation by ions exchanges in its network. Wairakite is a high temperature Ca-zeolite that is able, like all zeolite, to absorb ions in its structure that can be a good property with brine circulation. Its stability domain is well known in the system $Na_2O$—$CaO$—$MgO$—$Al_2O_3$—$SiO_2$—$H_2O$ in the range 0-500° C. and 01-10 kbar involving the phase's anorthite, grossular, prehnite and others. This phase does not exist in formulation #4 at higher density. A fraction of the silica in Composition #4 is coarser (silica) than the silica contained in Composition #3 (silica flour). That can explain a lower reactivity after one month resulting from lower water saturation in silica useful to form this phase. This also shows how the kinetics of the targeted phases (anorthite, wairakite) could be controlled by the particle sizes of the different components of the blend.

Compositions #1 and #2 are also tested to very high temperatures. The set cement cores are cured for one month at 300° C. and then cut into smaller samples and cured in a high temperature furnace. They are observed and analyzed by XRD and SEM following different curing durations. FIGS. 6-14 show the results obtained at 300° C. (58 days), 600° C. (9 days), 750° C. (30 days) and 900° C. (9 days)

Figure 6:
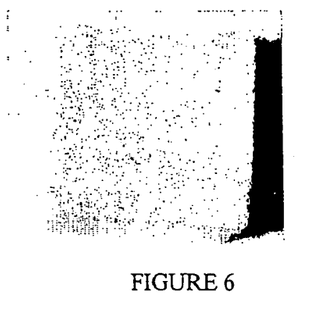
FIGS. 6-14 show photographs of cement samples after ageing at high temperatures for varying durations.
Figure 7:
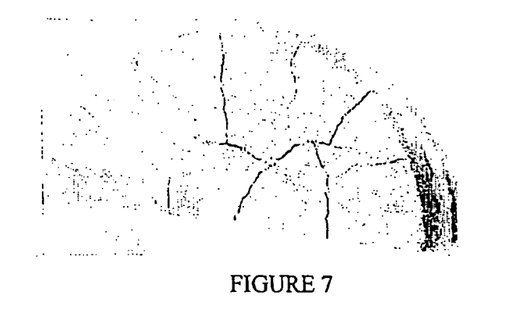
Figure 8:
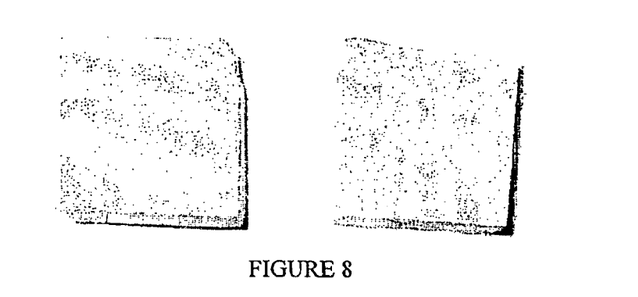
Figure 9:
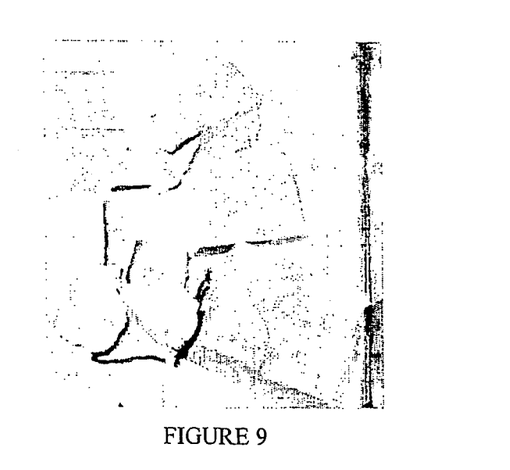

FIG. 6 shows a sample of composition #2 after two months at 300° C. and can be compared with FIG. 7 which shows the prior art composition #1 after the same period at the same temperature. For the prior art composition, cracks and many deleterious signs are observed, whereas composition #2 maintains its integrity well. FIG. 8 shows a sample of composition #2 after one week at 600° C. The set cement sample has been cut again with a small saw. Very consistent slices are obtained and no sign of degradation is observed. This can be compared with composition #1 after the same period at this temperature. The set cement sample is completely disintegrated and friable and it is not possible to saw the sample in the manner of composition #2.

Figure 10:
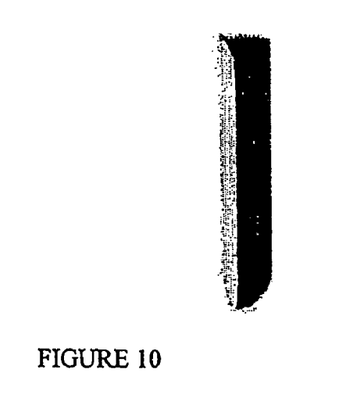
Figure 11:
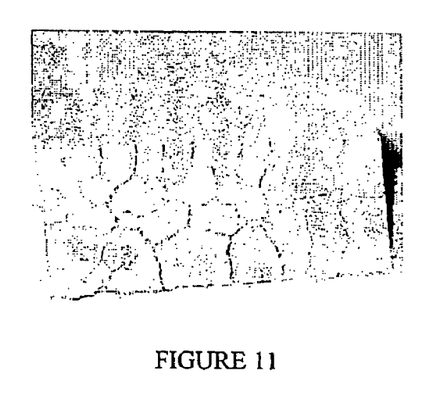

FIGS. 10 and 11 show compositions #2 and #1 after one week at 750° C., the composition #2 again keeping its integrity contrary to the low-density conventional composition #1.

Figure 12:
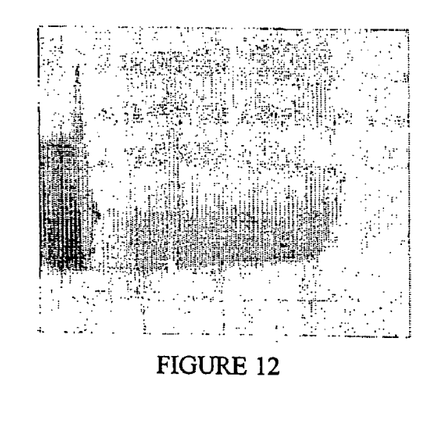
Figure 13:
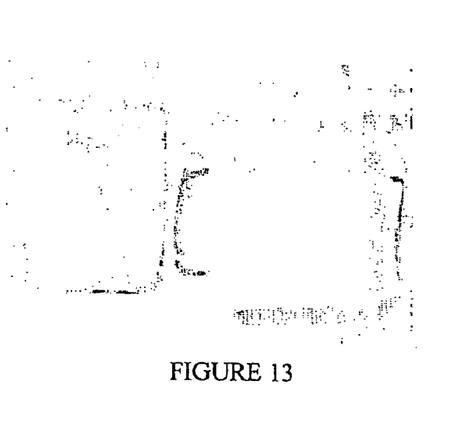
Figure 14:
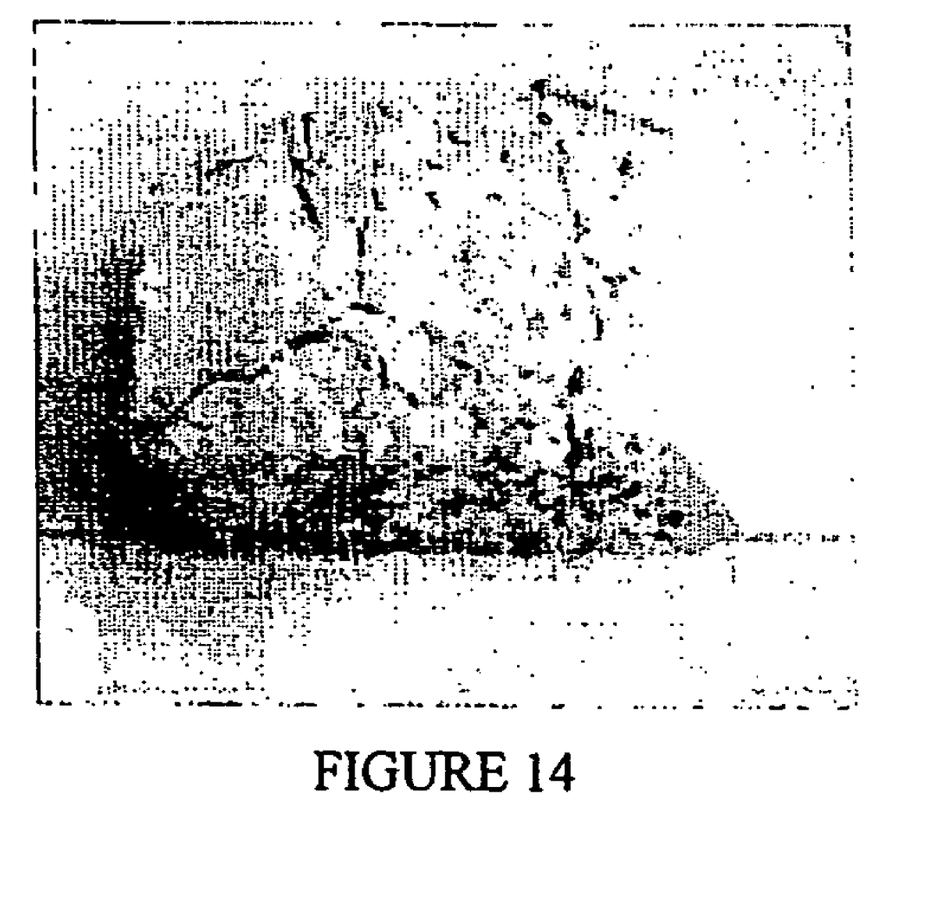
Figure 15:
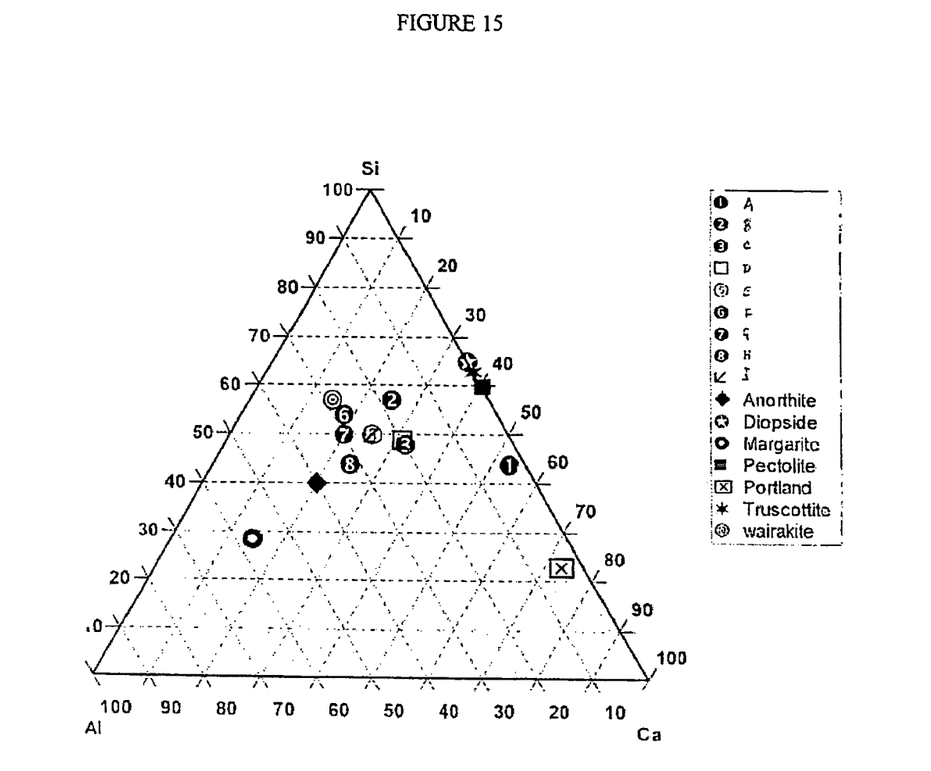
FIG. 15 shows the phase diagram of a ternary silicon/aluminium/calcium system showing the blend compositions tested (1-9) and various mineral phases.

FIGS. 12 and 13 show composition #2 after one week at 900° C. FIG. 12 shows the whole sample, FIG. 13 shows slices of set cement slices cut by a small saw. At 900° C., the new system keeps still a good integrity. The set cement can be cut into slices without splitting. FIG. 14 shows a sample of composition #1 after the same period at the same temperature. This sample again shows many cracks and deterioration signs and color variations.

The composition according to the present invention between 300° C. and 900° C. remains mainly Anorthite. From 600° C. some Wollastonite and Andradite-Grossular garnet minerals are well observed but Anorthite remains the main binder of this cement. Wairakite completely disappears and is replaced by Andradite-Grossular garnets.

The very high temperature curing is performed in air inside a refractory furnace and shows the good stability of the new system even at very high temperature. This stability is due to the Anoithite cement which is known to begin to smelt around 1300° C.

The present invention provides lightweight formulation using conventional Class G cement for temperatures up to 300° C. The set cement can show very good indications of durability (low permeability and no strength retrogression).

In the process used to design the slurry, the temperature stable phases (anorthite, wairakite) are selected; aluminum modifiers and silica oxides are added to the dry cement so that the elemental composition of the blend corresponds to the phases selected; the control of the particle size distribution and the relative amount of those minerals allow their addition at high concentration while leaving the slurry easily mixable and pumpable; and the kinetics of the targeted phases formation is then controlled by adjusting the crystallinity and the particle sizes of the different solids.

The typical oxide composition of Class G Portland cement is given in Table 6 (mass%) and that of TXI Lightweight cement, an aluminum enriched Portland cement available from Texas Industries, Dallas, Tex., USA is as given in Table 7:

TABLE 6

Typical oxide composition of Class G Portland cement

| CaO | SiO$_2$ | Fe$_2$O$_3$ | Al$_2$O$_3$ | SO$_3$ | MgO | Na$_2$O | K$_2$O |
|---|---|---|---|---|---|---|---|
| 64.2 | 19.4 | 5.5 | 4.5 | 2.8 | 2.0 | 0.1 | 0.6 |

TABLE 7

Oxide composition of TXI Lightweight cement

| CaO | SiO$_2$ | Fe$_2$O$_3$ | Al$_2$O$_3$ | SO$_3$ | MgO | Na$_2$O | K$_2$O |
|---|---|---|---|---|---|---|---|
| 38.5 | 35.7 | 5 | 10.5 | Not done | 1.8 | Not done | Not done |

The composition containing such cement has to be enriched with silicon and, optionally, aluminium in order to place it into the target elemental regions. However, the composition has to be able to be prepared with a quantity of mixing water such that the density of the slurry is of the order of the densities usually used for cementing an oil well or the like. Furthermore, the slurry must have rheological properties compatible with pumping in such a well.

The formulations of eleven slurries with densities between 1.89 g/cm$^3$ and 1.49 g/cm$^3$ based on oilwell cement are shown in Table 8 below. For the liquid components (fluid loss control agents and antifoaming agent), the quantities are indicated in gallons per sack of Portland cement (1 gps=3.78 litres per 94 pound cement sack, i.e., 1 gps=0.070 litres per kilogram of Portland cement). For all of the other components (the solid components) the quantities are given as the percentages by mass with respect to the mass of Portland cement (BMOC=by mass of cement). The position of each composition in the Si—Ca—Al ternary diagram is shown in FIG. 16.

All of the proposed formulations are optimised to obtain slurry with a rheology compatible with pumping in a subterranean well, which necessitates adding dispersing agents. Under these conditions, these slurries are stable and pumpable.

Composition #A is a prior art oil-well cement composition intended for high temperature wells, containing 35% BMOC of silica. The other compositions are compositions of the invention comprising between 0% and 190% BMOC of metakaolin, 0% to 80% BMOC of silica with a grain size close to that of a sand (D(v,50)=330 µm), a Portland cement (average particle size close to 20 µm), or of −10 micro-silica (average particle size close to 1.2 µm), and 0% to 72% of fly ash having a diameter between 50 µm and 400 µm.

Further advantageous details and characteristics of the invention will become apparent from the description below of tests established for different examples of additive compositions.

TABLE 8

| | # | | | | | | | | | | | |
|---|---|---|---|---|---|---|---|---|---|---|---|---|
| | A | B | C | Cbis | D | E | Ebis | F | G | H | I | Ibis |
| Sand | — | — | — | — | 40 | — | — | — | — | — | — | — |
| Silica | 35 | — | — | — | — | — | 37 | — | — | — | — | — |
| Micro-silica | — | 80 | 35.5 | 52 | — | 37 | — | 62 | 31 | — | 11.5 | 11.5 |
| Kaolinite | — | — | — | — | — | — | — | — | — | — | — | 28 |
| Metakaolin | — | 41 | 40.4 | — | 74 | 88.6 | 88.6 | 142 | 143 | 142 | 28 | — |
| Microalumina | — | — | — | 14 | — | — | — | — | — | — | — | — |
| Fly ash | — | 54.6 | 44.9 | 44 | 14.8 | 55.2 | 56.4 | 72 | 65 | 53 | 31.9 | 31.9 |
| Dispersing agent | 0.3 | 0.3 | 0.02 | 0.03 | 0.06 | 0.2 | 0.15 | 0.25 | 0.3 | 0.3 | 0.15 | 0.2 |
| Retarder 1 | 0.3 | 0.58 | 0.46 | 0.44 | 0.48 | 0.59 | 0.59 | 0.79 | 0.71 | 0.61 | 0.36 | 0.4 |
| Retarder 2 | 0.15 | 0.36 | 0.29 | 0.26 | 0.3 | 0.37 | 0.37 | 0.49 | 0.44 | 0.38 | 0.22 | 0.25 |
| Fluid loss control agent | 0.6 | — | 1.2 | 2.5 | — | — | — | — | — | — | — | — |
| Antifoaming agent | 0.05 | 0.03 | 0.03 | 0.03 | 0.03 | 0.03 | 0.03 | 0.03 | 0.03 | 0.03 | 0.03 | 0.03 |

The relative amounts of silicon, aluminium and calcium in these different formulations are as follows.

TABLE 9

| | # | | | | | | | |
|---|---|---|---|---|---|---|---|---|
| | A | B | C/Cbis | D | E/Ebis | F | G | H | I/Ibis |
| Silicon % | 46 | 57 | 48 | 49 | 50 | 54 | 50 | 44 | 50 |
| Aluminium % | 5 | 18 | 20 | 20 | 25 | 28 | 30 | 32 | 25 |
| Calcium % | 49 | 25 | 32 | 31 | 25 | 18 | 20 | 24 | 25 |

The following table 10 presents the average particle sizes, which have been used with these slurries. These average particle sizes are not a restrictive factor to form Anorthite and can be higher or lower.

TABLE 10

| # | D(v, 0.5) |
|---|---|
| Silica | 330 μm-2 μm |
| Kaolinite | 10 μm-2 μm |
| Metakaolin1 | 2 μm |
| Metakaolin2 | 10 μm |
| Fly ash | 400-50 μm |

Table 11 shows the effect of material reactivity, which has to be considered to reach as soon as possible the anorthite matrix.

The cement slurries are prepared, placed in a reactor and heated for 3 days at 150° C. and 20 MPa. On the fourth day, the temperature is raised to 300° C. over a period of 6 hours to prevent cracking by thermal shock. The cement slurries are kept under these conditions for 28 days. Mineralogical analysis by X ray diffraction is shown in Table 116.

Slurry#Cbis is a prior art slurry containing microalumina and the slurry #C metakaolin as aluminium and silicon source. These two blends have a Si/Ca/Al ratio that falls-well within the phase triangle described above.

TABLE 11

| Formulation | C | Cbis |
|---|---|---|
| Metakaolin | − | − |
| Microalumina | − | − |
| Quartz | − | − |
| Xonotlite | * | ++ |
| Anorthite | ++ | ++ |
| Wairakite | − | ++ |
| Hibonite - 5H | − | − |
| Riversiderite | + | − |

The following symbols are used in Table 11 and in the other tables below reporting mineralogical analyses:
++: represents a large quantity;
+: represents a small quantity;
*: trace
−: absence Formulation #C containing metakaolin is clearly more reactive, the set cement matrix after one month is mainly composed by anortlite. With formulation #A, wairakite and xonotlite are still well detected after one month and are metastable.

Table 12 shows the effect of Si/Al/Ca blend composition, the material composition and its size on the anorthite formation at short term. The cement slurries are prepared, placed in a reactor and heated for 3 days at 150° C. and 20 MPa. On the fourth day, temperature is raised to 300° C. over a period of 6 hours to prevent cracking by thermal shock. The cement slurries are kept under these conditions for 5 days. Mineralogical analysis by X ray diffraction is shown in Table 12:

TABLE 12

| | Formulation | | | | | | | | | |
|---|---|---|---|---|---|---|---|---|---|---|
| | A | B | C | D | E | F | G | H | I | Ibis |
| Metakaolin | − | − | − | − | − | − | − | − | − | − |
| Quartz | + | ++ | − | − | + | ++ | + | * | + | ++ |
| Xonotlite | ++ | ++ | + | * | − | − | − | − | − | − |
| Truscottite | − | ++ | + | − | + | − | + | − | + | + |
| Anorthite | − | ++ | ++ | ++ | ++ | + | ++ | ++ | ++ | + |
| Diopside | − | − | − | + | − | − | − | − | − | − |
| Wairakite | − | − | − | − | − | − | − | − | − | − |
| Hibonite - 5H | − | − | − | ++ | − | − | − | − | − | − |
| Riversiderite | − | − | + | − | − | − | − | − | − | − |

These results show that whatever the Si/Al/Ca blend composition, included in the Si—Ca—Al triangle in one of the Margarite-Quartz-Pectolite composition triangle, anorthite is well formed in the short term. The nearer the blend composition is to the composition of anorthite, the higher the final mineral assemblage contains anorthite, even in the short term.

The material particle size has an effect on the mineral assemblage at equilibrium at 5 days. But anorthite always is found to be the main binder in the short term, showing the high reactivity of the coarser material, at high temperature in the Margarite-Quartz-Pectolite-composition triangle.

The material nature is a major factor to form quickly anorthite.

Table 13 shows the effect of final mineral assemblage after 28 days at 300° C. on the set cement properties:

TABLE 13

| Formulation | 3 | 3bis |
|---|---|---|
| Compressive strength after 28 days at 300° C. psi (MPa) | 2570 (18) | 2100 (14.5) |
| Water permeability (mDarcy) | 0.02 | 0.12 |

Table 11 shows that metakaolin is more reactive than microalumina: the final mineral assemblage is mainly composed of anorthite. Formulation C exhibits after one-month better compressive strength and particularly lower water permeability than formulation Cbis.

This water permeability improvement of "Anorthite" cement is an additional positive factor in term of durability towards brine or carbon dioxide.

By selecting as a an aluminium and silicon modifier, an at least partially calcined metakaolin in accordance with the invention, it is possible to obtain a slurry that will set at both bottom hole and surface temperatures, thus avoiding the need to design a specific lead slurry that is optimised to set at surface (i.e. low temperature) and a tail slurry that is optimised to set downhole (i.e. high temperature).

Table 14 below shows a comparison between a conventional cement composition (X) optimised to set at high temperature, and a composition (Y) according to the invention.

TABLE 14

| Slurry | X | Y |
|---|---|---|
| Density (g/cm³) | 1.49 | 1.49 |
| Solids Volume Fraction % | 54 | 57 |
| Free Water | 0 | 0 |
| Blend | Cement | Cement |
| | Silica Flour | Silica Flour |
| | Cenospheres | Cenospheres |
| | | Metakaolin calcination product (PoleStar 200R) |

TABLE 14-continued

| Slurry | X | Y |
|---|---|---|
| Plastic viscosity (cP)/Yield value after mixing conditioning (lbs/100 sqft) | 33/6 | 284/10 |
| Plastic viscosity (cP)/Yield value after 20 min conditioning (lbs/100 sqft) | 16/13 | 129/6 |
| Reading on FANN mod.35SA viscosimeter (R1-B1-F1) Gel at 10 min | 11 | 14/7 |
| Thickening Time (hours) 300° F. (BHCT) | 4:00 | 3:00 |
| UCA Transit Time | 0:06 | 0:04 |
| Compressive Strength psi after 24 hours @ 300° F. (BHST) | 2200 | 3450 |
| setting time @ 50 psi | 5:30 | 4:39 |
| setting time @ 500 psi | 6:00 | 4:46 |
| Compressive Strength 24 hours @ 85° F. (BHST) | No set after 5 days | |
| 48 hours @ 85° F. (BHST) | | 114 |
| setting time @ 50 psi | | 23:00 |
| setting time @ 500 psi | | 27:33 |

Sample X is a conventional, low-density slurry (see, for example EP 0 621 247 and WO 01/09056) that has been optimised (retarded set) for high temperature conditions by the addition of silica flour. Thickening is observed after 4 hours at BHCT and setting after 5:30/6:00 hours BHST. While a compressive strength of 2200 psi develops after 24 hours at BHCT, no set can be observed at surface temperature. In a situation like this, the normal practice would be to pump a conventional, non-retarded slurry for the first part of the job (i.e. the portion of the cement that ultimately ends up at the surface) and switch to a retarded slurry for the second part of the job (i.e. the portion of the cement that ultimately is exposed to the high temperatures). Obviously there are problems in such an approach. Switching between two slurries with such differing behaviours can present difficulties if there is any mixing between the two slurries in the well. Also, it is inevitable that some part of each slurry will be exposed to conditions for which it is not optimised with the possibility that it does not set.

Sample Y is a slurry according to one embodiment of the invention. The modification of silicon and aluminium composition is achieved using silica flour and a calcination product of metakaolin (PoleStar 200R). The effect of this is that not only a good high temperature set observed (thickening at 3 hours, setting at 4:39/4:46 hours BHST, compressive strength of 3450 psi after 24 hours BHST) but setting is also observed at surface temperature (23:00/27:33 hours, compressive strength after 24 hours 114 psi and after 48 hours 2125 psi). Thus single cement slurry can be used to cement the whole well, avoiding the problems with using different lead and tail slurries discussed above. Particular benefits are: saving of rig time, improved mud removal with reduction of risk of vapour pressure induced casing collapse.

While the calcination product of metakaolin used in this example is PoleStar 200R, other such materials can be used. A number of metakaolin products, with greater or lesser degrees of calcinations are readily available and can be used depending on the effect desired.

The methods of the invention can be used to design cement blends of a suitable cement and other solid additives which, when mixed with sufficient water can form pumpable slurries. In well cementing, the slurries are pumped into the well in question and allowed to set to provide zonal isolation and well stabilization. The compositions can also be used to line pipes. In this case, a cement slurry is placed inside a pipe, which is then rotated, typically at high speed to coat the slurry onto the inside of the pipe where it is allowed to set.

The invention claimed is:

1. A pumpable cement slurry, comprised of water and particulate solids, including cement and mineral oxides, intended to be exposed to a temperature range between about 250° C. and 900° C., wherein:
   (i) said cement is a Portland cement or an aluminum enriched Portland cement;
   (ii) said mineral oxides comprise:
      up to 190% by mass of cement (BMOC) kaolin, calcinations products of kaolin, metakaolin or calcination products of metakaolin,
      up to 80% by BMOC silica,
      up to 72% BMOC fly ash;
   (iii) all particulate materials have discrete particle sizes so that the packing of the particulate materials is optimized;
   (iv) the slurry density ranges from about 1.40 g/cm$^3$ to 1.94 g/cm$^3$; and
   (v) the mineralogical bulk oxide composition of the particulate solids falls within the margarite-quartz-pectolite triangle within the Ca—Al—Si ternary diagram and promotes the formation of anorthite at said temperature range.

2. A pumpable cement slurry, comprised of water and particulate solids, including cement and mineral oxides, intended to be exposed to a temperature range between about 250° C. and 900° C., wherein:
   (i) said cement is a Portland cement or an aluminum enriched Portland cement;
   (ii) said mineral oxides comprise:
      up to 190% by mass of cement (BMOC) kaolin, calcinations products of kaolin, metakaolin or calcination products of metakaolin,
      up to 80% by BMOC silica,
      up to 72% BMOC fly ash;
   (iii) said particulate solids include low-density particles with a specific gravity less than 0.8;
   (iv) all particulate materials have discrete particle sizes so that the packing of the particulate materials is optimized;
   (v) the slurry density ranges from about 1.40 g/cm$^3$ to 1.94 g/cm$^3$; and
   (vi) the mineralogical bulk oxide composition of the particulate solids falls within the margarite-quartz-pectolite triangle within the Ca—Al—Si ternary diagram and promotes the formation of anorthite at said temperature range.

3. The slurry according to claim 1, wherein:
   (i) the average particle size of the kaolin, calcination products of kaolin, metakaolin and calcination products of metakaolin is 2 μm to 10 μm;
   (ii) the average particle size of the silica is 2 μm to 330 μm; and
   (iii) the average particle size of the fly ash is 50 μm to 400 μm.

4. The slurry according to claim 2, wherein:
   (i) the average particle size of the kaolin, calcination products of kaolin, metakaolin and calcination products of metakaolin is 2 μm to 10 μm;
   (ii) the average particle size of the silica is 2 μm to 330 μm; and
   (iii) the average particle size of the fly ash is 50 μm to 400 μm.

5. The slurry according to claim 1, wherein the mineralogical composition in the Si—Ca—Al triangle is 44%-57% Si, 18%-32% Ca and 18%-32% Al.

6. The slurry according to claim 2, wherein the mineralogical composition in the Si—Ca—Al triangle is 44%-57% Si, 18%-32% Ca and 18%-32% Al.

7. The cement slurry of claim 2, wherein said low density particulate material comprises silica/alumina microspheres.

8. A method of cementing a well having a high temperature region in the range 250° C.-900° C., and a relatively low temperature region, including pumping the cement slurry of claim 1 in both the high temperature and low temperature region.

9. A method of lining a pipe for high temperature fluids comprising preparing a cement slurry according to claim 1, the determined temperature being the temperature of the fluids in the pipe; placing the slurry in the pipe and rotating the pipe so as to deposit the slurry evenly on the inner surface of the walls of the pipe.

10. A method of cementing a well with the pumpable slurry of claim 1, said well having a high temperature region in the range 250° C.-900° C.

11. A method of cementing a well with the pumpable slurry of claim 2, said well having a high temperature region in the range 250° C.-900° C.

* * * * *